Jan. 16, 1923.
E. P. CRANDALL.
AUTOMOBILE STEERING GEAR LOCK.
FILED SEPT. 28, 1920.
1,442,605
2 SHEETS-SHEET 1
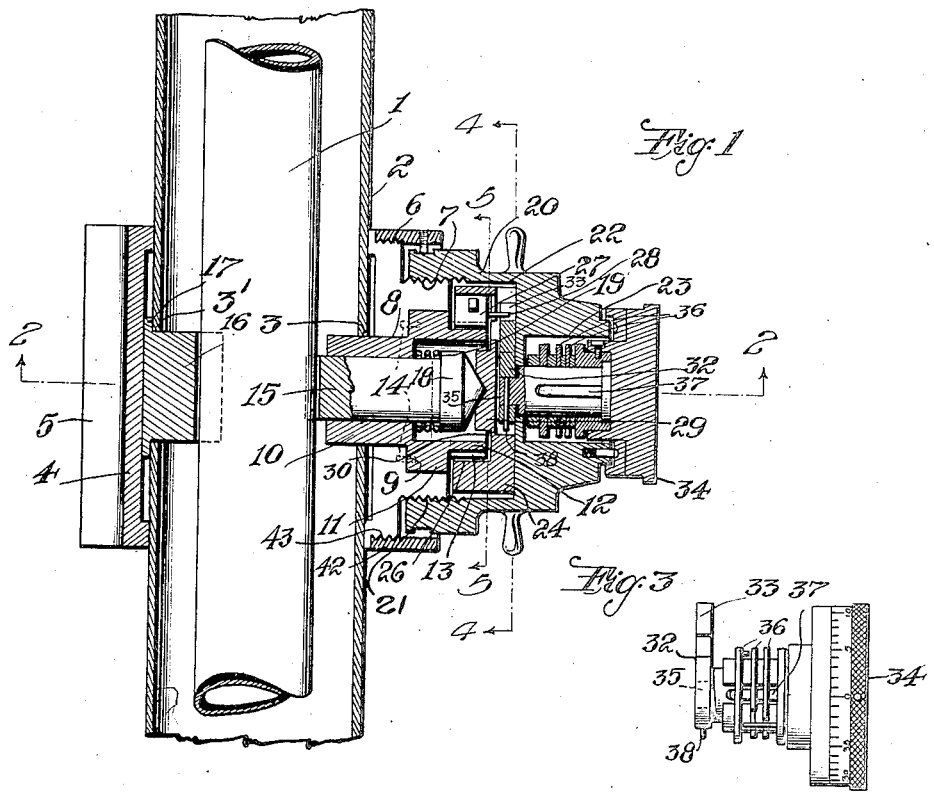
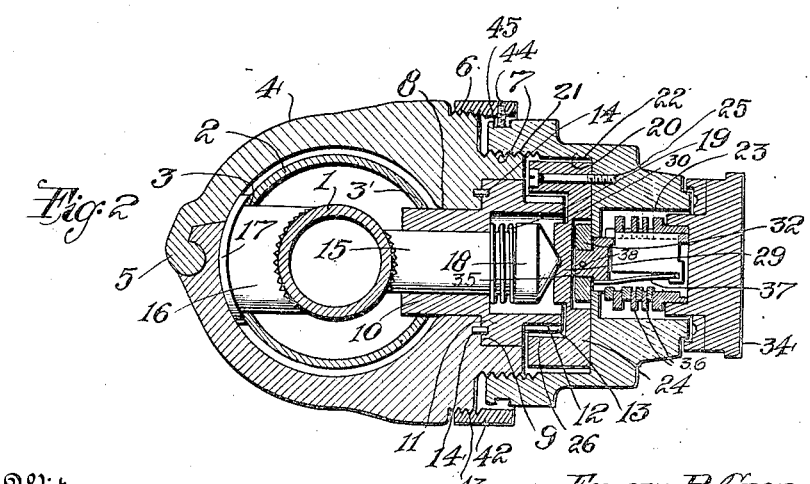
Witnesses
H. Woodard
Inventor
Emery P. Crandall
By Shreve, Crowe & Gordon
Attorneys Jan. 16, 1923.
E. P. CRANDALL.
AUTOMOBILE STEERING GEAR LOCK.
FILED SEPT. 28, 1920.
1,442,605
2 SHEETS-SHEET 2
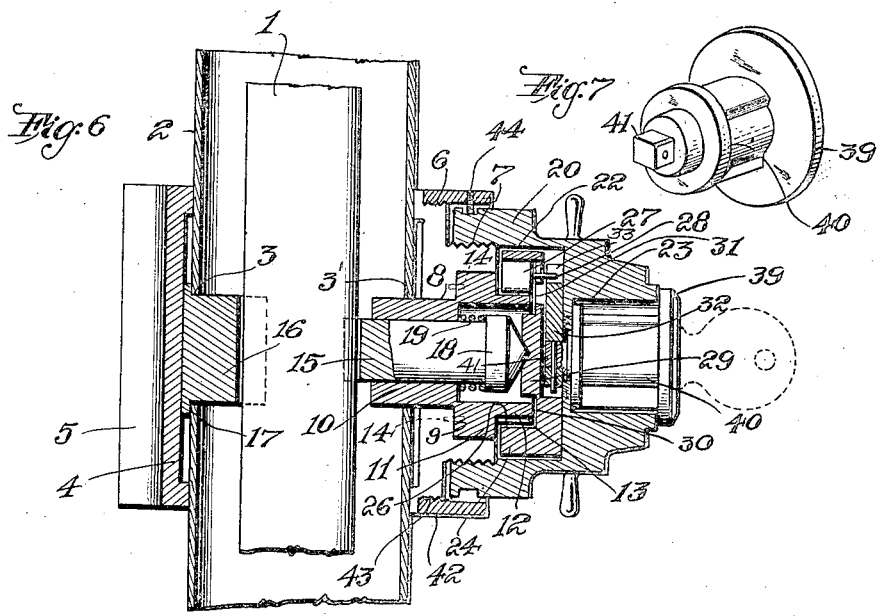
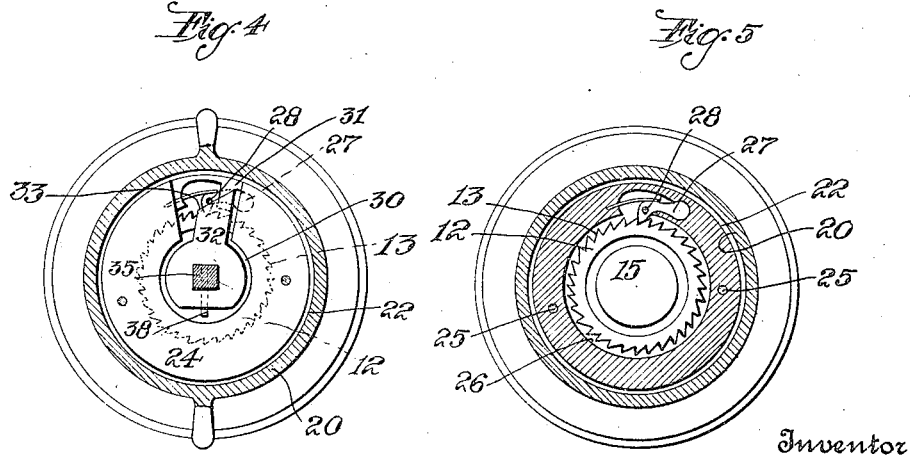
Witness
H. Woodard
Inventor
Emery P. Crandall
By Shreve, Crowe & Gordon,
Attorneys Patented Jan. 16, 1923.

1,442,605

UNITED STATES PATENT OFFICE.

EMERY P. CRANDALL, OF WASHINGTON, DISTRICT OF COLUMBIA.

AUTOMOBILE STEERING-GEAR LOCK.

Application filed September 28, 1920. Serial No. 413,344.

*To all whom it may concern:*

Be it known that I, EMERY P. CRANDALL, a citizen of the United States, residing at Washington, in the District of Columbia, have invented new and useful Improvements in Automobile Steering-Gear Locks, of which the following is a specification.

This invention from a general aspect relates to lock construction, but it is more especially directed to a locking mechanism applicable to the steering column of an automobile, to fixedly secure the steering gear when the vehicle is not in use.

One of the fundamental purposes of this invention is to provide a simple and effective automobile lock of the permutation or key type, applicable to the steering column at a predetermined point in its length, and having facilities for gripping the steering post against rotary movement to prevent actuation of the steering gear when the vehicle is not in use.

Another important feature of this lock resides in its manner of attachment, which enables application to any standard steering construction without necessitating the usual indentation or perforation of the steering post, which only weakens the latter and renders it more susceptible to damage when subjected to severe torsional stresses.

Another important phase of this invention is the arrangement which renders the lock effective by a mere rotation or two of the lock housing, thus eliminating the use of key or permutation mechanism except for releasement purposes. This construction affords a further advantage, in that it is apt to frustrate any attempt to tamper with the lock, since rotation of the housing can only serve to bring the locking elements more firmly into engagement with the steering post.

Other important features of this invention are: to design an automobile lock which may be released by a permutation lock mechanism or through the instrumentality of a standard key lock construction, depending upon the desire of the user; to provide a simple automobile lock capable of being quickly disassembled for purposes of repair or substitution of worn parts; and finally, to afford a lock mechanism by which any attempts to tamper with or release the lock other than in the proper manner will result in further increasing the frictional action of the gripping members upon the steering post.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a fragmentary sectionized view of the lock in operative position;

Fig. 2 is a horizontal section on the line 2—2 of Fig. 1;

Fig. 3 is a detail elevation of a permutation lock releasing mechanism;

Figs. 4 and 5, are transverse vertical sections on the lines 4—4 and 5—5, respectively, of Fig. 1;

Fig. 6 is a fragmentary sectionized view of the lock in operative position showing modified form of releasing means; and Fig. 7 is a detailed perspective view of the key controlled type of releasing means.

Various efforts as indicated by the prior art, have been made to provide a simple and inexpensive locking mechanism capable of effectively locking the steering gear of an automobile, but the constructions so far designed have proven more or less objectionable as being either too elaborate in mechanical details, and consequently, expensive to install, or else, their application has been found to dangerously weaken the steering post. It is, therefore, the purpose of this invention to design a lock of the character specified which embodies but few parts, may be easily attached to any standard steering column, and when so positioned functions as a reenforcement and presents an extremely artistic appearance.

Briefly stated, this invention comprises a split ring housing designed to embrace the steering column, oppositely positioned gripping elements adapted to frictionally engage the exterior surface of the steering post, one of the elements being depressible, a lock housing rotatable in one direction to actuate the depressible element and bring the same into frictional engagement with the steering post, and a permutation mechanism co-acting with the lock housing to enable its rotation in the opposite direction to permit disengagement of the depressible element and releasement of the lock.

Reference being had to the accompanying drawings, there is shown a fragment of a standard steering post 1 and its enclosing column 2, which is formed with oppositely located openings 3 and 3', excepting these openings, the above is standard construction and is referred to for descriptive purposes only.

For the sake of convenience and to enable ready comprehension of this invention it shall be divided into the following headings and considered in the order specified, namely, split ring housing, combined ratchet and plunger sleeve, plungers, lock housing, thrust plate construction, permutation or key release mechanism, operation, and conclusion.

Split ring housing.

Embracing steering column 2 is a split ring housing 4 hinged as at 5 and externally threaded as at 6 and 7, the opposing surfaces of the free ends of the housing being machined to produce opening 8 aligning with opening 3 in the steering column, and terminating in an annular seat 9.

Combined ratchet and plunger sleeve.

Extending through the opening 8 and into the interior of the steering column through opening 3 is a plunger sleeve 10 having an annular flange 11, designed to fit within seat 9. Sleeve 10 is also formed with an extension 12 externally toothed to provide a ratchet 13 secured against rotary movement by dowel pins 14 projecting from flange 11 into split ring housing 4.

Plungers.

A plunger 15 is slidably positioned within sleeve 10, and also passes through opening 3 of the steering column to co-operate with an oppositely positioned plunger 16 extending through the opening 3', to engage opposite sides of the steering post. The engaging surfaces of the plungers 15 and 16 are arcuate shaped to conform to the contour of the steering post, and serrated to assist the gripping action of the plungers. The outer extremity of plunger 16 is formed with a flange 17 to maintain the plunger in proper operative position. The outer extremity of plunger 15 terminates in a conical shaped head 18. A spring 19 encircling plunger 15 immediately beneath its head tends to normally maintain said plunger in a retracted position.

Lock housing.

An annular lock housing 20 internally threaded as at 21 engages the exteriorly threaded surface 7 of split ring housing 4. Housing 20 is interiorly formed with annular inter-communicating recesses 22 and 23.

Thrust plate construction.

A thrust plate 24 seats within the opening 22 and is fixedly secured to the lock housing by a suitable fastening means, in the present instance, screws 25. The inner face of the thrust plate 24 is formed with a central cavity 26 of sufficient depth to accommodate ratchet 13. Within the periphery of plate 24 above ratchet 13 is a pivotally mounted spring pressed pawl 27 adapted to normally engage ratchet 13 and prevent rotation of the lock housing except in a clockwise direction.

A pin 28 extends laterally from the head of pawl 27 for a purpose which will hereinafter appear. Within cavity 26 of the thrust plate and central thereof is a bearing block 29 having a depression corresponding in contour to the tip of plunger head 18 which it is intended to receive, as clearly shown in Figs. 1 and 2. The outer face of thrust plate 24 is formed with an annular depression 30 opening into a flared recess 31, constituting a seat for the arcuately movable lever 32. The free extremity of lever 32 is beveled as at 33 to afford a sliding engagement with pin 28 to elevate the pawl and enable anticlock-wise rotation of the lock housing.

Permutation or key release mechanism.

Lever 32 for elevating pawl 27 may be rotated by a permutation mechanism such as is shown and described in my Patent No. 1,230,126, patented June 19, 1917, and embodying generally, a revolvable dial plate 34, shaft 35, tumblers 36, and spring pressed detent 37, the latter when in operative position serving to connect the shaft 35 to the dial plate 34. In the event this structure is employed, dial plate 34 is fitted to the open extremity of the lock housing, with shaft 35 and its accompanying parts located within the opening 23 of the lock housing. The inner end of shaft 35 is squared and projects into a similarly shaped opening in lever 32 wherein it is secured by pin 38, thus permitting operation of the lever when the proper combination has been effected.

Should it be desirable, a key controlled type of release mechanism may be substituted for the permutation arrangement just described, whereupon the design shown in Fig. 6 is employed. This design generally, embodies key plate 39, lock barrel 40, and shaft 41, the key plate being fitted to the open end of the housing, with lock barrel 40 and shaft 41 extending into opening 23. The free end of the shaft is squared and affixed to lever 32 as described in connection with the permutation mechanism.

Although two types of release mechanisms have been referred to, it is to be understood that the lever 32 may be actuated by any of the standard constructions now used for devices of this kind, since manifestly any releasement device having suitable dimensions could be readily inserted in the open end of the lock housing, and operatively connected to the lever 32.

A ring 42 internally threaded as at 43 engages the externally threaded surface 6 of the split ring housing. This ring is provided with a depending pin 44 which projects into the annular groove 45 circumscribing the lock housing. The purpose of this construction is to limit the longitudinal movement of the lock housing to prevent complete disengagement from the split ring housing.

Operation.

Assuming the components of this lock assembled as in Figs. 1 and 2, but with the plunger retracted, to render the lock effective the lock housing is rotated clock-wise until this movement is checked by the resistance offered by the plunger, which in the meantime, owing to the rotary movement of the housing, has been longitudinally actuated into binding engagement with the steering post to prevent rotation of the latter. This locks the steering gear, which cannot be released except by counter clock-wise movement of the lock housing, this, however, is prevented by the pawl of the thrust plate being in engagement with the rachet of the plunger sleeve.

To release the lock, the proper combination is effected or key used, in which event, the pawl of the thrust plate is disengaged from the ratchet on the plunger sleeve through the instrumentality of the lever of the permutation or key controlled mechanism, this elevation of the pawl permits counter clock-wise rotation of the lock housing and retractile movement of the plunger under the influence of its spring which thus renders the lock inactive.

Conclusion.

In conclusion, it will be manifest the foregoing structure provides a steering gear lock which is simple, readily manipulated, and produces a maximum of protection against unlawful operation of the vehicle to which it is applied.

Although in the foregoing, certain elements may have been set forth as best adapted to perform the functions allotted to them, nevertheless, it is to be understood that various minor changes as to form, substance, etc., may be resorted to within the scope of the appended claims without departing from or sacrificing any of the principles of this invention.

Having thus described my invention, and without enumerating variations and equivalents, what I desire protected by Letters Patest is as set forth in the following claims:

1. A steering gear lock comprising a movable plunger, means rotatable in one direction to depress the plunger and normally locked against movement in the opposite direction, and additional means co-acting with the first mentioned means permitting operation of the latter in the opposite direction and restoration of the plunger to its initial position, such means including a fixed ratchet and rotary pawl, with mechanism for elevating said pawl.

2. A steering gear lock, comprising a movable plunger having operative and inoperative positions, means rotatable in one direction to actuate the plunger to operative position, such means being normally locked against movement in the opposite direction, and additional means co-acting with the first mentioned means to permit rotation of the latter in the opposite direction and restoration of the plunger to inoperative position, such means including a fixed ratchet and rotary pawl, with mechanism for elevating said pawl.

3. A steering gear lock, comprising a movable plunger, means capable of clock-wise and anticlock-wise rotation, such means being normally locked against anticlock-wise movement and operable clock-wise to depress the plunger, and additional means co-acting with the first mentioned means to permit its anticlock-wise movement and enable restoration of the plunger to its initial position, such means including a fixed ratchet and rotary pawl, with mechanism for elevating said pawl.

4. A steering gear lock, comprising a housing adapted to embrace the steering post column of an automobile, a retractile plunger slidably mounted within the housing, a rotatable member engaging the housing and operable clock-wise to depress the plunger but normally held against anti clock-wise movement, and releasement mechanism associated with said member to permit anti clock-wise movement thereof and restoration of the plunger to its initial position, such mechanism including a fixed ratchet and a rotary pawl, with means for elevating the pawl.

5. A steering gear lock, comprising a housing adapted to embrace the steering post column of an automobile, a retractile plunger slidably mounted within the housing and depressible into frictional engagement with the steering post, a rotatable member engaging the housing and operable clock-wise to depress the plunger but normally held against anticlock-wise movement, and releasement mechanism associated with said member to permit anticlock-wise movement thereof and restoration of the plunger to its initial position, such mechanism including a fixed ratchet and a coacting pawl, with means for elevating the pawl.

6. The combination with an automobile steering post; of a retractile plunger operable into engagement with the post, means cooperating with the plunger capable of clock-wise and anticlock-wise rotation, such means being normally locked against anticlock-wise movement and operable clockwise to depress the plunger, and additional means coacting with the first mentioned means to permit its anticlock-wise movement and enable restoration of the plunger to its initial position, such means including a fixed ratchet and a rotary pawl with mechanism for elevating the pawl.

EMERY P. CRANDALL.

Witnesses:
C. DUDLEY SHREVE,
WILL T. GORDON.